United States Patent Office 3,439,532
Patented Apr. 22, 1969

3,439,532
TENSILE TESTING MACHINE FOR METALLIC TEST PIECES
Marc Grumbach, Le Pecq, Yvelines, and André Guimard, Saint Germain-en-Laye, France, assignors to Institut de Recherches de la Siderurgie Francaise, Saint Germain-en-Laye, France
Filed Nov. 29, 1966, Ser. No. 597,742
Claims priority, application France, Dec. 2, 1965, 40,660
Int. Cl. G01l 7/16
U.S. Cl. 73—89                5 Claims

ABSTRACT OF THE DISCLOSURE

A recording device for measuring the strain hardening coefficient of a metallic test piece includes two measuring lines feeding a respective input corresponding respectively to the orthogonal coordinates $x$, $y$. Each line delivers an electric signal respectively proportional to $\log_e \sigma$ and $\log_e \epsilon$, wherein $\sigma$ is the stress to which the test piece is subjected and $\epsilon$ is the true strain of the test piece. The first measuring line comprises an extensometer arranged to measure the length of the test piece and delivers a signal to one of the inputs which is proportional to the logarithm of the logarithm of the measured length. The second measuring line comprises a dynamometer and delivers a signal to the other input which is the sum of the first-named signal and a signal proportional to the logarithm of the logarithm of the load applied to the test piece.

---

The present invention relates to the rapid, automatic determination of certain parameters characterizing the mechanical properties of a metallic test piece subjected to a tensile test. It has for its specific object the measurement of the strain hardening coefficient by automatically tracing the straight line defined by the relation $\log_e \sigma = f(\log_e \epsilon)$, wherein $\sigma$ is the true stress to which the test piece has been submitted and $\epsilon$ is the true strain, according to presently used international terminology.

To accomplish this object, this invention provides a recording device in a tensile testing machine for metallic test pieces. The device records the functions of two orthogonal coordinates $x$, $y$ and includes two inputs corresponding respectively to $x$ and $y$, and two measuring lines feeding the inputs. Each measuring line is actuated to deliver an electrical signal respectively proportional to $\log_e \sigma$ and $\log_e \epsilon$. For this purpose, the first measuring line comprises an extensometer arranged to measure the length of a portion of the test piece during the test, first logarithm generating means delivering a signal $e_1$ proportional to the logarithm of said length and a second logarithm generating means delivering a signal $e_2$ proportional to the logarithm of $e_1$. The signal $e_2$ is applied to one of the inputs of the recording device. The second measuring line comprises a dynamometer delivering a signal $e_3$ proportional to the load applied to the test piece, a third logarithm generating means delivering a signal $e_4$ proportional to the logarithm of $e_3$, and an adding circuit delivering a signal $e_5$ proportional to the sum of $e_4$ and $e_1$. The signal $e_5$ is applied to the other input of the recording device.

Throughout the specification and claims, the term logarithms refers to natural logarithms.

In a preferred embodiment of the invention, the first measuring line is discontinuous and comprises a mechanical extensometer, and a mobile element coupled to, and moved by, the extensometer. The mobile element carries markers arranged to register with a fixed marker adjacent the mobile element during the tensile test. A detecting element is arranged to emit a pulse each time one of the markers of the mobile elements registers with the fixed marker, and a relay system is actuated by these pulses to deliver two different electrical voltages respectively representing the signals $e_1$ and $e_2$ for each marker of the mobile element.

According to one feature of the invention, the mobile element may be an opaque plate defining a plurality of very narrow slits constituting the markers. A light source is arranged adjacent the opaque plate for projecting light through the slits, and the detecting element is a photoelectric cell.

According to another feature of the invention, the spacing between successive markers on the mobile element increases exponentially according to the formula $x = a^y$, the voltage of signal $e_1$ increases by equal steps at each of the markers, and the voltage of signal $e_2$ increases by stages, remaining at each stage proportional to $\log_e e_1$ at the same moment.

According to yet another feature, the spacing between successive markers on the mobile element may increase exponentially according to the formula $x = (a)^{a^y}$, the voltage of signal $e_1$ may increase by equal steps at each of the markers, and the voltage of signal $e_2$ may increase by stages, remaining at each stage proportional to $a^{e_2}$ at the same moment.

The above and other features of the present invention will become more apparent in connection with the following detailed description of the one embodiment thereof, chosen for illustrative purposes only and taken in conjunction with the drawing wherein FIG. 1 is a schematic representation of the tensile testing machine combined with the recording device of this invention;

Figure 1:
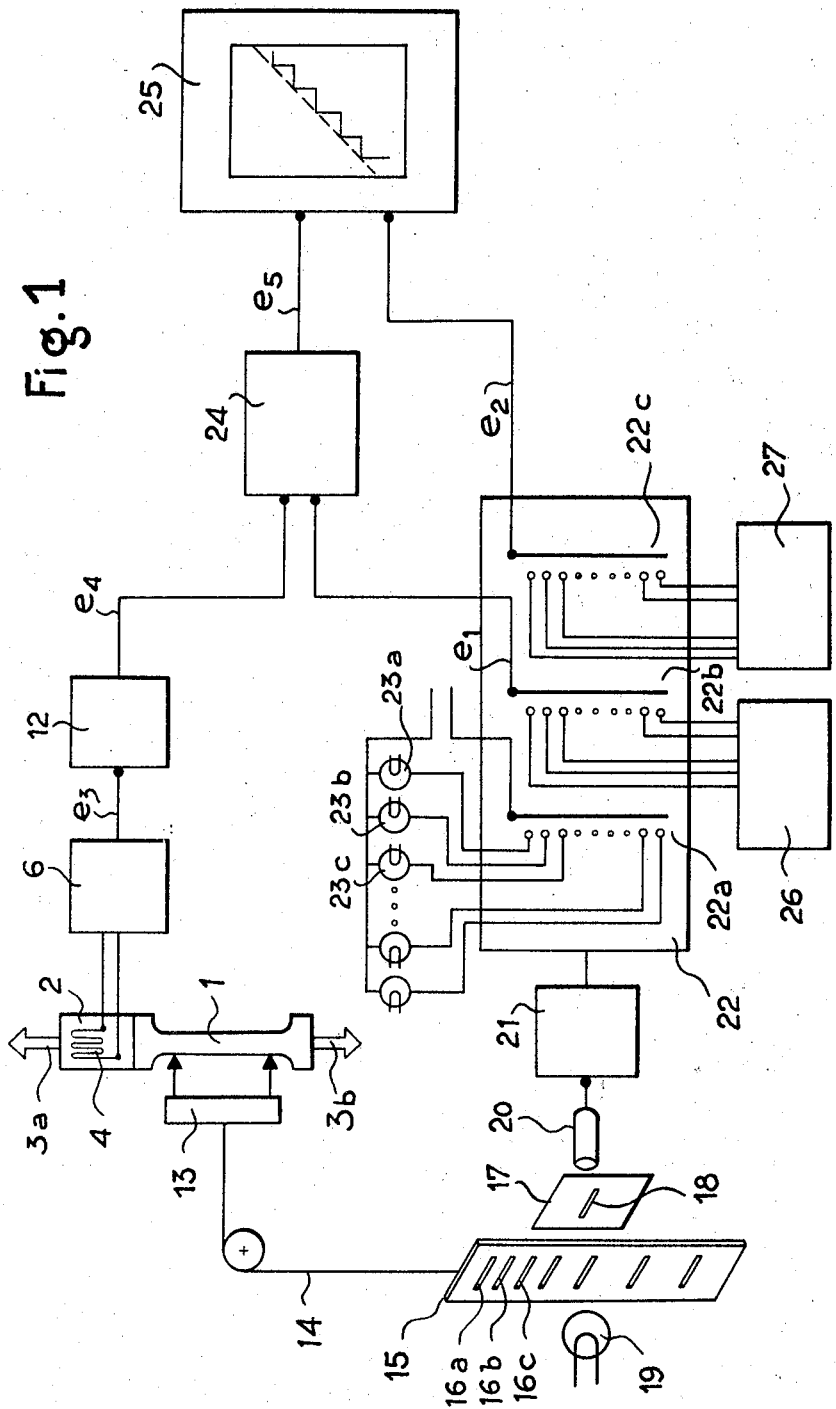

Experience has shown that knowledge of the coefficient of anisotropy, which characterizes the ability of a metal sheet to resist necking, and the strain hardening coefficient, which is a measure of the metal's ductility, makes it possible to judge the drawing ability of metal sheets. To evaluate the drawing characteristics has in the past required many delicate measurements, followed by a time consuming computation. It is, therefore, desirable to provide an automatic and accurate determination of these parameters.

The strain hardening coefficient is measured by the exponent $n$ of the equation $$\sigma = k\epsilon^n \qquad (1)$$

wherein $\sigma$ is the true stress, $\epsilon$ the true strain and $k$ is a constant. This equation is a good approximation, at least for soft steels.

Assuming a test piece of the original cross sectional area $S_0$ and length $l_0$, which is elongated and diminished in cross section during the test. Further assuming that the volume remains equal during the entire test, the instantaneous cross section S of the test piece and its length $l$ are related to each other at any moment of the test as follows:

$$S_0 : S = l : l_0 \qquad (2)$$

Taking the logarithm of Equation 1, one obtains $$\log_e \sigma = \log_e k + n \log_e \epsilon \qquad (3)$$

Accordingly, the strain hardening coefficient $n$ is determined by the slope of the straight line given by the following equation $$\log_e \sigma = n \log_e \epsilon + \text{constant} \quad (4)$$

If this straight line can be automatically traced during the test, its slope will immediately indicate the normal strain (elongation).

It is known that in Equation 1, $$\epsilon = \log_e \frac{l}{l_o}$$

the Equations 1 and 2 having been empirically established. Accordingly, $$\log_e \epsilon = \log_e \log_e \frac{l}{l_o} \quad (5)$$

Thus, $$\log_e \epsilon = \log_e \log_e l \text{ (at an approximate constant)} \quad (6)$$

On the other hand, $$\sigma = P/S \quad (7)$$

wherein P is the load to which the test piece is subjected. Accordingly, $$\log_e \sigma = \log_e P - \log_e S \quad (8)$$

But, according to Equation 2, $$S = \frac{S_o l_o}{l}$$

whence it follows that $$\log_e \sigma = \log_e P - \log_e S_o - \log_e \frac{l_o}{l} \quad (9)$$

$$\log_e \sigma = \log_e P + \log_e l \text{ (at an approximate constant)} \quad (10)$$

The present invention provides an automatic instrument tracing in the course of a tensile test the curve $$\log_e P + \log_e l = f(\log_e \log_e l) \quad (11)$$

i.e.

$$\log_e \sigma = f(\log_e \epsilon) \quad (12)$$

Referring now to the drawing and first to FIG. 1, a conventional sheet metal tensile testing machine is schematically represented by a thin sheet metal test piece 1 and a dynamometer 2, the arrows 3a, 3b indicating the directions of the load applied to the test piece. Dynamometer 2 is a steel bar subjected to the same load as the test piece. The section of the steel bar is so calculated that the stress remains always within the range of the linear elastic deformations. Four resistance wires are mounted on the steel bar and are connected in series to operate as elongation gages, a single gage 4 being shown in FIG. 1 for the sake of clarity.

Figure 2:
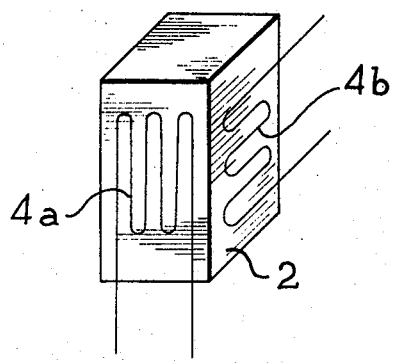
FIG. 2 shows the load receiving part of the tensile testing machine in details.
Figure 3:
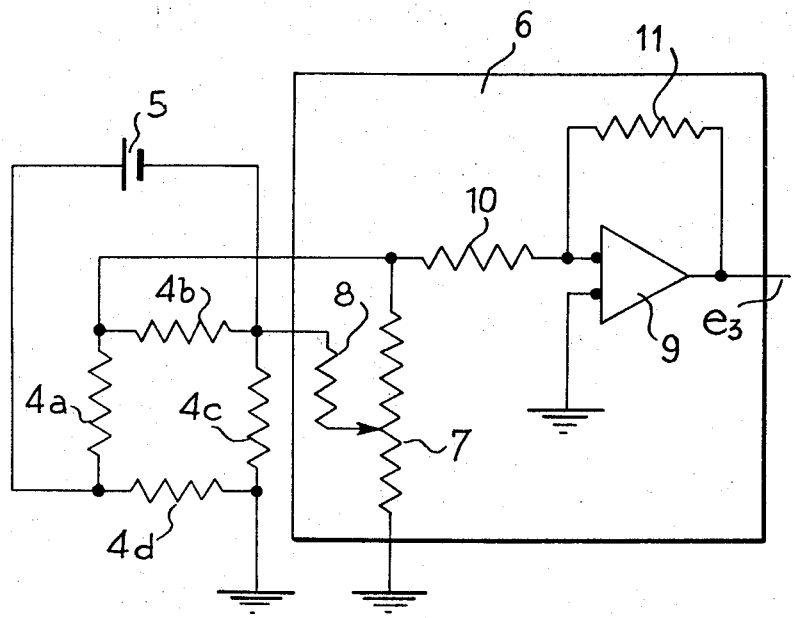
FIG. 3 is a circuit diagram of the part of FIG. 2.

FIGS. 2 and 3 show the details of the apparatus measuring the load applied to test piece 1. The four elongation gages are bonded to the steel bar 2, two of the resistance wires 4a, 4c extending in a longitudinal direction and the two other resistance wires 4b, 4d extending in a transverse direction, the resistance wires extending in the same direction being bonded to the opposite faces of the quadrangular steel bar 2.

As seen in FIG. 3, the four gages form a complete bridge circuit receiving a continuous constant voltage of 8 volts from a current source 5. A continuous electric signal $e_3$ proportional to the load is emitted by circuit 6.

At rest, the bridge circuit of the gaging resistance wires is adjusted to zero output by means of potentiometer 7 and a resistance 8. Upon the application of a load, the resulting unbalance current of the bridge circuit is amplified in a constant relationship by a large-gain amplifier 9, the amplification ratio being defined by two resistance elements of high stability 10 and 11. Thus, the amplified signal $e_3$ is proportional to the load, and this signal is applied to a circuit 12 transforming a linear scale into a logarithmic scale (see FIG. 1) which delivers signal $e_4$ proportional to the logarithm of $e_3$.

This logarithmic circuit is an attenuator comprising conventional resistors associated with non-linear elements (crystal diodes) which simulate the desired logarithmic curve by a succession of small straight segments. The entire circuit is contained in a housing at constant temperature to assure the stability of its properties. A useful logarithmic attenuator for this purpose is sold under the trademark "Logaten," whose precision, which is better than 1%, is sufficient for the purpose. Circuit 12 generates a signal $e_4$ where $$e_4 = A + B \log_e e_3$$

wherein A and B are constants.

The elongation of the test piece 1 during the test is measured by mechanical extensometer 13 of any suitable design, many such extensometers being readily available on the market.

The movement of the extensometer is transmitted by a flexible cable 14 to a mobile opaque plate 15 defining a plurality of very narrow transparent slits 16. Plate 15 may be of metallized glass, for instance. An opaque diaphragm 17 defining a fixed marker 18 constituted by a very narrow slit 18 parallel to slits 16 is arranged adjacent the plate 15. A source of light 19 is placed on the side of the opaque plate 15 facing away from the diaphragm and a photoelectric cell 20 is disposed on the side of the diaphragm facing away from plate 15. Thus, the photoelectric cell operates as a detecting element delivering a pulse each time one of the markers 16a, 16b, 16c, etc. registers with the fixed marker 18.

The pulse emitted by the photoelectric cell is amplified by a suitable amplifier 21 and actuates a step-by-step relay system 22 of the type utilized in automatic commutation or in telephony. The relay system comprises three independent circuits, one circuit controlling the production of signal $e_1$ proportional to the logarithm of elongation, a second circuit controlling the production of signal $e_2$ proportional to the logarithm of $e_1$, and the third circuit controlling the lighting of a series of signaling lamps 23a, 23b, 23c, etc., indicating the position of the step-by-step relay circuit 22 at each moment.

As shown in the circuit diagram of FIG. 1, the signals $e_1$ and $e_4$ are delivered to an adding circuit 24 which produces a signal $e_5$ representative of the expression $$\log_e P + \log_e \frac{l}{l_o}$$

or $$\log_e P + \log_e \frac{S_o}{S}$$

Signal $e_5$ is applied to one input of a two-axis recording device 25 and the signal $e_2$ is applied to the other input of the same device. Thus, it is seen that the first measuring line is discontinuous in that it produces separate values for signals $e_1$ and $e_2$ corresponding to predetermined elongations of the test piece, as marked by the spacing between the slits of the plate 15. The signals $e_1$ and $e_2$ are furnished by very stable current sources 26 and 27 delivering continuous signals which are precisely controlled. The desired straight line is thus traced in 15 points which provides a sufficient precision. The continuous signal from the second measuring line and the discontinuous signal from the first line produce a record in the form of stairs whose apices are the points defining the straight line which gives the desired reading.

To obtain a regular recording, the slits 16a, 16b, 16c, etc. are separated by spacings increasing exponentially line $a^{ak}$, wherein $k=1, 2, 3, \ldots 15$. The signal $e_2$, which represents $$\log_e \log_e \frac{S_o}{S}$$

thus varies by equal steps. For a recording scale of 20 mv. the steps are 1 mv. The signal $e_2$ is retained by circuit 22c of the relay system on a chain of 15 equal resistors connected in series (not shown), supplied by current source 27. The signal $e_1$, which represents $\log_e S_o/S$, is retained by circuit 22b of the relay system on 15 helicoidal potentiometers with 10 turns contained in the current source 26 (not shown). These potentiometers are provided with dials and are adjusted precisely according to the material of the test piece to furnish signals which are added to the signal furnished by the logarithmic attenuator 12.

Figure 4:
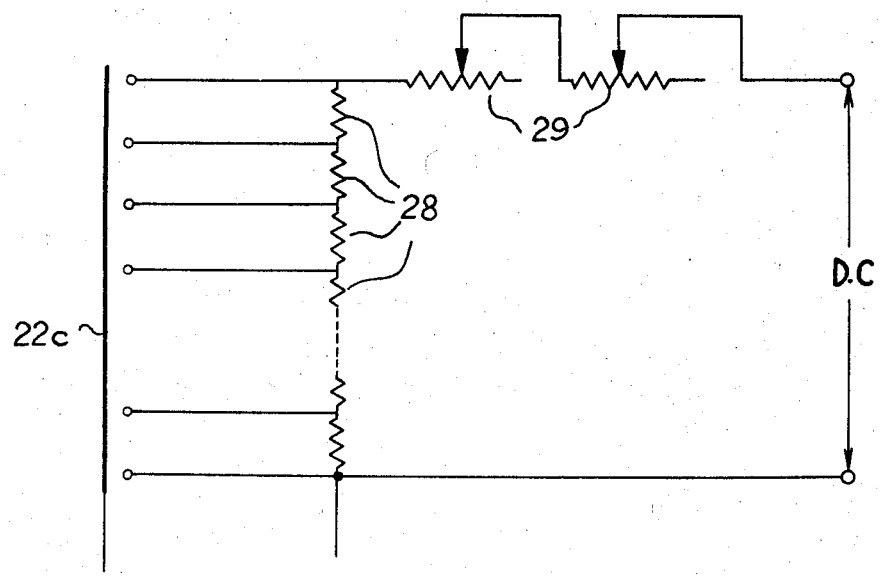
FIGS. 4 and 5 are circuit diagrams of portions of the recording device.
Figure 5:
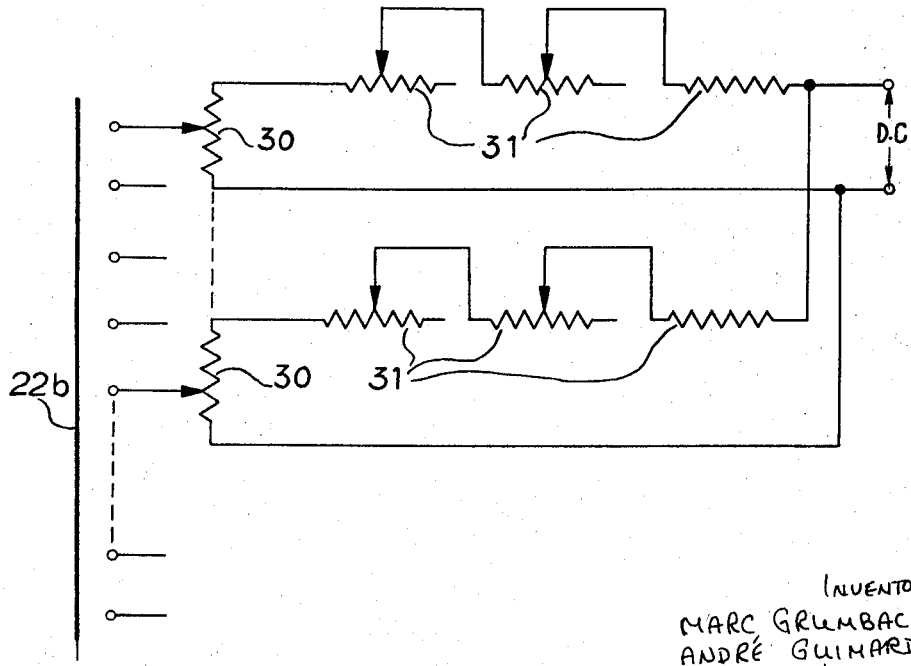

FIGS. 4 and 5 show circuit diagrams of the current sources 26 and 27 in detail. FIG. 4 shows the fixed equal resistors 28 on which the circuit 22c of the relay system retains the signal $e_2$. The current in the resistors 28 is supplied by a rectifier (not shown), stabilized at 15 volts in a conventional manner by Zener effect diodes. This current is adjusted by two adjustable resistors 29. FIG. 5 shows current source 26 with its potentiometers 30 with 10 turns, two such potentiometers being shown by way of example. The current, which is delivered by the same rectifier which supplies power to resistors 28, is controlled in each potentiometer by resistors 31.

The operation of the device is quite simple and proceeds as follows:

During a tensile test, the test piece 1 is elongated and the plate 15 is displaced. As each slit 16 passes the fixed marker 17 in accordance with a predetermined elongation of the test piece, the step-by-step relay advances one step and thus chooses signals $e_1$ and $e_4$ corresponding to the elongation. During this time, the load increases constantly and the signal $e_4$ also increases progressively. Thus, the recording takes the form of steps whose apices or edges correspond to each stage of predetermined elongation, the apices being aligned in a straight line measuring the slope of which is measured. After gauging, this slope is a measure of $n$, as explained above.

We claim:

1. In combination with a tensile testing machine for metallic test pieces: a recording device of functions of two orthogonal coordinates $x$, $y$, the recording device including
    (1) two inputs corresponding respectively to $x$ and $y$,
    (2) a mobile element coupled to the extensometer and each of said lines adapted to deliver an electric signal respectively proportional to $\log_e \sigma$ and $\log_e \epsilon$, wherein $\sigma$ is the stress to which the test piece is subjected and $\epsilon$ is the true strain of the test piece,
        (a) a first one of said measuring lines comprising an extensometer arranged to measure the length of a portion of the test piece during the test, first logarithm generating means delivering a signal $e_1$ proportional to the logarithm of said length and a second logarithm generating means delivering a signal $e_2$ proportional to the logarithm of $e_1$, the signal $e_2$ being applied to one of said inputs, and
        (b) a second one of said measuring lines comprising a dynamometer delivering a signal $e_3$ proportional to the load applied to the test piece, a third logarithm generating means delivering a signal $e_4$ proportional to the logarithm of $e_3$, and an adding circuit delivering a signal $e_5$ proportional to the sum of $e_4$ and $e_1$, the signal $e_5$ being applied to the other input.

2. In the combination of claim 1, the first measuring line comprising
    (1) a mechanical extensometer,
    (2) a mobile element coupled to the extensometer and carrying markers,
    (3) a fixed means adjacent the mobile element and responsive to the passage of the markers on the mobile element, respective ones of the markers of the mobile element being arranged to register with the fixed means during a tensile test.
    (4) a detecting element arranged to emit a pulse each time one of the markers on the mobile element registers with the fixed means, and
    (5) a relay system actuated by said pulses and delivering two different electrical voltages representing respectively the signals $e_1$ and $e_2$ for each marker of the mobile element.

3. In the combination of claim 2, wherein the mobile element is an opaque plate defining a plurality of very narrow slits constituting said markers, a light source is arranged adjacent the opaque plate for projecting light through said slits, and the detecting element is a photoelectric cell.

4. In the combination of claim 2, wherein the spacing between successive markers on the mobile element increases exponentially according to the formula $x=a^y$, the voltage of the signal $e_1$ increases by equal steps at each of said markers, and the voltage of the signal $e_2$ increases by stages, remaining at each stage proportional to $\log_e e_1$ at the same moment.

5. In the combination of claim 2, wherein the spacing between successive markers on the mobile element increases exponentially according to the formula $x=(a)^{ay}$, the voltage of the signal $e_1$ increases by equal steps at each of said markers, and the voltage of the signal $e_2$ increases by stages, remaining at each stage proportional to $a^{e_2}$ at the same moment.

References Cited

UNITED STATES PATENTS

| | | | |
|---|---|---|---|
| 3,141,727 | 7/1964 | Devereaux | 346—29 |
| 3,220,250 | 11/1965 | Strandquist et al. | 73—95 |
| 3,304,768 | 2/1967 | Naumann et al. | |
| 3,352,151 | 11/1967 | Yoshida et al. | 73—89 |

RICHARD C. QUEISSER, *Primary Examiner.*

JERRY W. MYRACLE, *Assistant Examiner.*

U.S. Cl. X.R.

73—95